(12) United States Patent
Gafni et al.

(10) Patent No.: US 9,356,945 B2
(45) Date of Patent: May 31, 2016

(54) AUTOMATIC CONTENT INSPECTION SYSTEM FOR EXPLOIT DETECTION

(71) Applicant: HYPERWISE SECURITY LTD, Tel Aviv (IL)

(72) Inventors: Aviv Gafni, Ramat Gan (IL); Ben Omelchenko, Tel Aviv (IL)

(73) Assignee: CHECK POINT ADVANCED THREAT PREVENTION LTD, Tel Aviv (IL)

( * ) Notice: Subject to any disclaimer, the term of this patent is extended or adjusted under 35 U.S.C. 154(b) by 0 days.

(21) Appl. No.: 14/333,566

(22) Filed: Jul. 17, 2014

(65) Prior Publication Data

US 2016/0021130 A1 Jan. 21, 2016

(51) Int. Cl.
*G06F 9/455* (2006.01)
*H04L 29/06* (2006.01)
*G06F 21/56* (2013.01)

(52) U.S. Cl.
CPC ........ *H04L 63/1425* (2013.01); *G06F 9/45533* (2013.01); *H04L 63/145* (2013.01); *H04L 63/1466* (2013.01); *H04L 63/1483* (2013.01)

(58) Field of Classification Search
CPC .............. G06F 21/53; G06F 2212/151; G06F 2009/45587; G06F 2009/45575
See application file for complete search history.

(56) References Cited

U.S. PATENT DOCUMENTS

| | | | | |
|---|---|---|---|---|
| 8,745,745 B2* | 6/2014 | Mooring | ............. | G06F 9/45558 713/164 |
| 2006/0136720 A1* | 6/2006 | Armstrong | .............. | G06F 21/53 713/164 |
| 2009/0158432 A1* | 6/2009 | Zheng | .................. | G06F 21/562 726/24 |
| 2013/0275945 A1* | 10/2013 | Kollberg | ............ | G06F 9/45558 717/124 |
| 2013/0283370 A1* | 10/2013 | Vipat | ....................... | G06F 21/44 726/17 |
| 2014/0115578 A1* | 4/2014 | Cooper | ............... | H04L 63/1416 718/1 |
| 2014/0215226 A1* | 7/2014 | Litty | ....................... | G06F 21/53 713/193 |
| 2014/0229942 A1* | 8/2014 | Wiseman | ............ | G06F 9/45558 718/1 |
| 2014/0283077 A1* | 9/2014 | Gallella | ................ | G06F 21/566 726/24 |
| 2014/0372719 A1* | 12/2014 | Lange | ................... | G06F 21/554 711/163 |

* cited by examiner

*Primary Examiner* — Venkat Perungavoor
(74) *Attorney, Agent, or Firm* — Mark M. Friedman

(57) ABSTRACT

A method of inspecting content intended for a workstation to detect content that performs malicious exploits, including receiving the content for inspection at an inspection server using a processor and memory, loading a virtual machine at the inspection server with an operating system and processes for activating the content, wherein the operating system and processes are similar to those executed at the intended workstation, activating the content in the virtual machine, tracing activity of the virtual machine to form trace data by using features of the processor, wherein upon occurrence of an exception control is transferred to an analyzer that analyzes the trace data based on a context of the exception; and a notification is provided if suspicious activity is detected.

17 Claims, 6 Drawing Sheets

AUTOMATIC CONTENT INSPECTION SYSTEM FOR EXPLOIT DETECTION

TECHNICAL FIELD

The present disclosure relates generally to detection of attacks on computerized systems and more specifically to attacks that exploit vulnerabilities in operating systems or other applications to gain control.

BACKGROUND

In recent years advanced persistent threats (APT) have become widespread in targeting organization and businesses for political and/or economical motives. The initial infiltration is generally performed by use of social engineering, sending attachments and/or links by email (referred to as spear phishing) and/or using active content on websites (referred to as a watering hole) to serve as a malicious exploit. An email may contain an attachment with specially designed documents (for example word documents or PDF files) that exploit vulnerabilities of the programs used to view the attachments.

Once a user opens the email attachment or accesses the water hole with a web browser, a first stage of attack takes place exploiting the vulnerability of the application executed at the user's workstation (e.g. the web browser (EXPLORER, CHROME), WORD, ACROBAT READER etc). typically the exploit manages to gain control and builds an environment to execute low level code called a "shell-code", which expands or downloads a full functional backdoor. Once the backdoor is installed on the user's workstation it can establish a connection with an attacker control server and receive commands or operate independently.

Most of the detection solutions concentrate on the last stage in which the malware already landed at the user's workstation. Traditional antivirus programs typically use static signatures to detect malicious malware. The signatures are created manually by an analyst after analyzing the malware. Various malware analysis techniques allow the analyst to quickly determine in detail the risk and intention of a given malware sample. The analyst can react to new trends in malware development by refining existing detection techniques and countermeasures to mitigate the threat from the malware sample.

The desire of analysts to understand the behavior of a given sample and the opposing intention of malware authors to disguise their malicious intent, leads to an arms race between the two parties. As analysis tools and techniques become more elaborate, attackers come up with evasion techniques to prevent their malware from being detected and analyzed. These techniques include self modifying or dynamically generated code, as well as detecting the presence of an instrumented analysis environment and responding differently when being analyzed.

A security technique called "sandboxing" aims at detecting malware code by subjecting it to run in a dedicated simulated virtual environment on a computer based system of one type or another to analyze it for behavior and traits indicative of malware. A sandbox system tries to get infected by the malware and analyze its behavior inside the simulated virtual environment. Nowadays, sandboxing is a leading alternative to traditional signature-based malware defenses, and it is used to spot and analyze prior unknown malware and stealthy attacks in particular.

Malware authors sometimes use evasion techniques to thwart attempts to analyze them. The malware attempts to detect whether it is being run inside a sandbox or in a real execution environment. If the malware detects a sandbox it can act differently or simply not run. There are many techniques used today by malware authors to evade "sandboxing" technology, for example:

1. Stalling code that delays the execution of malicious code so that the sandbox times out. The stalling may be implemented by using direct CPU instructions or by performing useless computations to give the appearance of performing activity;

2. Environment checks that test the operating system or the virtual environment by the malware to determine if they are running in a legitimate environment or are being watched. Analysts are then forced to "patch" the sandbox to prevent the malware from detecting them and disguising their operations.

Most of the sandbox evasion techniques are implemented during the last stage when the full operational backdoor is in place on the target machine or at the earliest during execution of the "shell-code". During the exploit stage the attacker does not yet control the computational resources sufficiently to apply evasion techniques. Therefore it is desirable to detect the malware during the exploit stage.

No matter what particular exploitation method is employed, the ultimate aim of an attacker is to perform malicious computations on the target system by executing machine instructions that are under control of the attacker. Usually, malicious computations are caused by illegitimate code that was not provided or intended to be executed by the developer of the exploited process (e.g. WORD) or the by the end user of the system. The malicious code is usually injected into the target system using external network data or application files.

As a countermeasure to injecting external code, operating systems have adapted techniques to prevent execution of code that was not intended to be executed. One method is Data Execution Prevention (DEP), which ensures that code is not executed from data pages. Another method is Address Space Layout Randomization (ASLR) in which the execution addresses of executed processes are allocated at random so an attacker will not know the execution address before the process is actually loaded.

Most of the technologies today analyze and search for the malware itself. However since new malware or new permutations of old malware are introduced almost every day it makes it extremely difficult to find all of them and create signatures in a timely manner to thwart attacker attempts with standard protection programs.

SUMMARY

An aspect of an embodiment of the disclosure relates to workstations in an organizational network receiving content (e.g. by email attachments) or accessing content (e.g. using a web browser), wherein an inspection server intercepts the content and verifies that the content is not malicious content attempting to exploit vulnerabilities of the processes required to activate the content, for example WORD for text documents or CHROME for web pages.

The inspection server forms images for the workstations of the organizational network, wherein an image allows the inspection server to quickly load a virtual machine for a workstation. The virtual machine executes the same or a similar operating system as the workstation and the same or similar processes that are used to activate the content. Once the inspection server loads a virtual machine for the workstation it activates the content in the virtual machine to inspect it. The inspection server traces activity of the virtual machine, for example including flow control instructions executed by the processes, dumps of the content of memory pages that are to be executed and/or hashes of the binaries loaded or unloaded in the context of the executed process. Upon occurrence of specific events referred to as exceptions control is transferred to an analyzer that analyzes the trace data in the context of the exception to determine if the trace data indicates that suspicious activity occurred or not.

Optionally, if suspicious activity occurred the content may be quarantined so that it will not reach the workstation or the workstation may be warned to avoid the content. In some embodiments of the disclosure, the workstation may be disconnected from the network to prevent the transfer of the malicious content.

In an exemplary embodiment of the disclosure, the exception occurs every time a buffer receiving the list of control flow instructions from the inspection server processor is full, the analyzer reviews the list to verify that no suspicious activity occurred such as returning to an address that is not proceeding a call instruction. In an exemplary embodiment of the disclosure, an exception occurs every time the memory page with executable code is swapped by the operating system. Optionally, the analyzer may verify that the page receiving control is marked as a code page and not part of a data area of the process being executed.

In some embodiments of the disclosure, a process crash or an operating system crash will cause an exception. Optionally, the virtual machine/operating system or process may be reloaded to retry activation of the content. If the content causes a crash multiple times it would be considered suspicious.

There is thus provided according to an exemplary embodiment of the disclosure, a method of inspecting content intended for a workstation to detect content that performs malicious exploits, comprising:

Receiving the content for inspection at an inspection server using a processor and memory;

Loading a virtual machine at the inspection server with an operating system and processes for activating the content, wherein the operating system and processes are similar to those executed at the intended workstation;

Activating the content in the virtual machine;

Tracing activity of the virtual machine to form trace data by using features of the processor;

Wherein upon occurrence of an exception control is transferred to an analyzer that analyzes the trace data based on a context of the exception; and a notification is provided if suspicious activity is detected.

In an exemplary embodiment of the disclosure, the inspection server intercepts the content before being provided to the workstation. Alternatively, the inspection server receives the content from the workstation.

In an exemplary embodiment of the disclosure, the trace includes recording details of flow control instructions executed by the virtual machine. Optionally, the trace includes recording a list of modules inside processes executed by the virtual machine and the addresses of memory pages used by the modules. In an exemplary embodiment of the disclosure, the trace includes recording a page dump of memory pages used by modules of processes executed by the virtual machine when initializing the modules. Optionally, the trace includes recording a page dump of a memory page used by modules of processes executed by the virtual machine before starting to execute code from the memory page.

In an exemplary embodiment of the disclosure, the exception includes a change in the executed page address due to transfer of control from one process to another by the operating system. Optionally, the exception includes receiving notification that a memory for storing details of flow control instructions executed by the virtual machine is full. In an exemplary embodiment of the disclosure, the exception includes receiving notification if the processor is set to execute code from a user mode memory page while the current privilege level of the processor is lower than 3.

In an exemplary embodiment of the disclosure, the trace includes recording a page dump of a memory page wherein the page permissions changed from non-executable to executable. Optionally, the exception includes receiving notification that the process crashed or that the operating system crashed. In an exemplary embodiment of the disclosure, the trace includes receiving a memory page marked as read/write/execute and changing the memory page permissions in the shadow page table to read/write;

if an attempt to execute code from the page occurs then changing the memory page permissions in the shadow page table to read/execute and dumping the page content; then if an attempt to write to the page occurs changing the memory page permissions in the shadow page table to read/write.

In an exemplary embodiment of the disclosure, activity is suspicious if activation of the content leads to detection of jump oriented programming (JOP) patterns. Optionally, activity is suspicious if activation of the content leads to detection of return oriented programming (ROP) patterns. In an exemplary embodiment of the disclosure, activity is suspicious if activation of the content leads to a crash of the process or of the operating system in the virtual machine. Optionally, activity is suspicious if activation of the content leads to the processor being set to a different execution level than a memory page with the code being executed.

There is further provided according to an exemplary embodiment of the disclosure, an inspection server for inspecting content intended for a workstation to detect content that performs malicious exploits, comprising:

A general purpose computer using a processor and memory to serve as the inspection server receiving the content for inspection;

A hypervisor application in the inspection server for loading a virtual machine with an operating system and processes, wherein the operating system and processes are similar to those executed at the intended workstation;

An analyzer application;

Wherein the inspection server is programmed to activate the content and trace activity of the virtual machine to form trace data by using features of the processor; and upon occurrence of an exception the analyzer analyzes the trace data based on a context of the exception and notifies if suspicious activity is detected.

In an exemplary embodiment of the disclosure, the operating system is halted when the analyzer application is executed in the virtual machine.

There is further provided according to an exemplary embodiment of the disclosure, a non-transitory computer readable medium comprising computer code to be executed by a general purpose computer for performing the methods described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
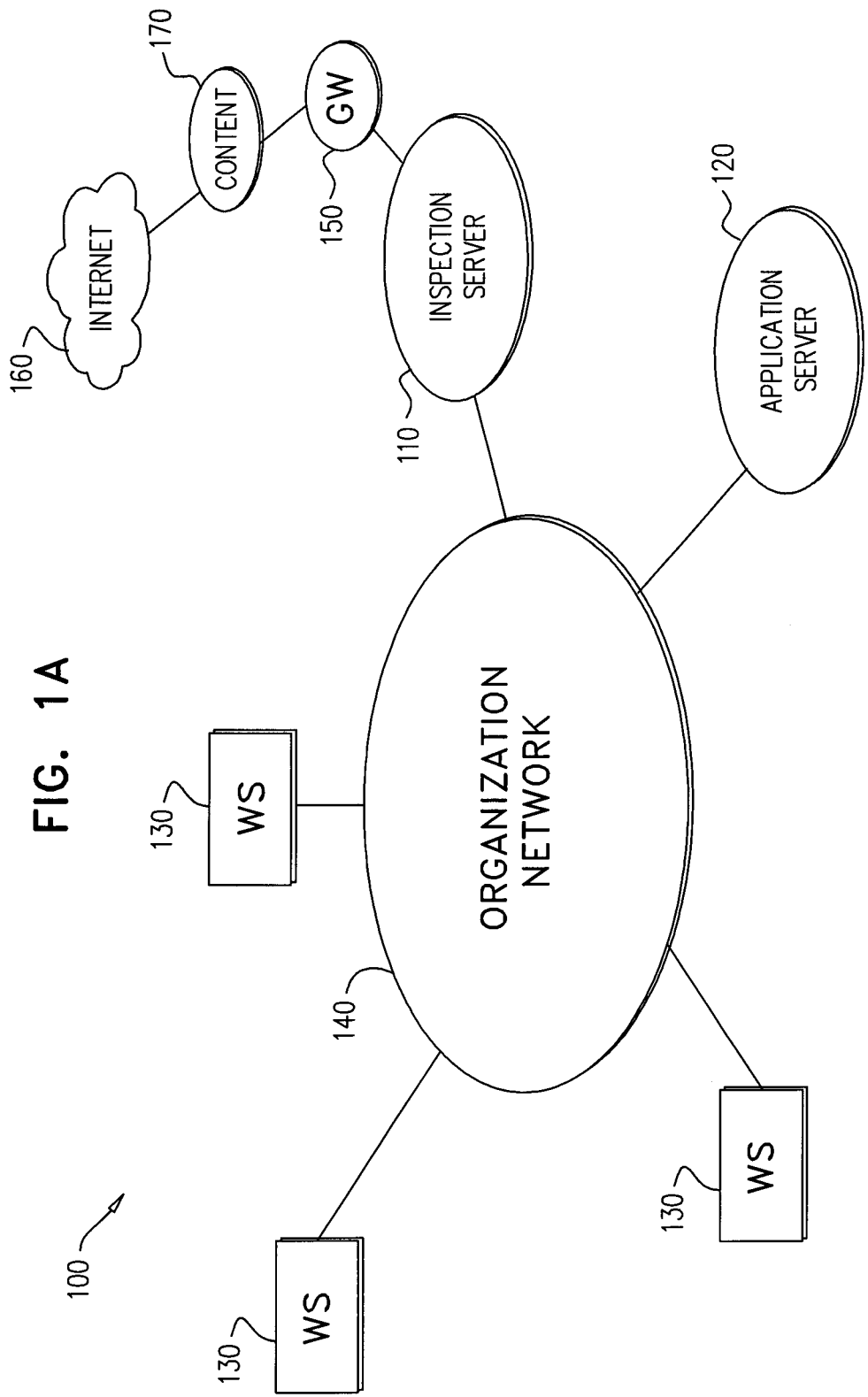
FIG. 1A is a schematic illustration of a system for inspecting files in an organizational network, according to an exemplary embodiment of the disclosure.
Figure 1B:
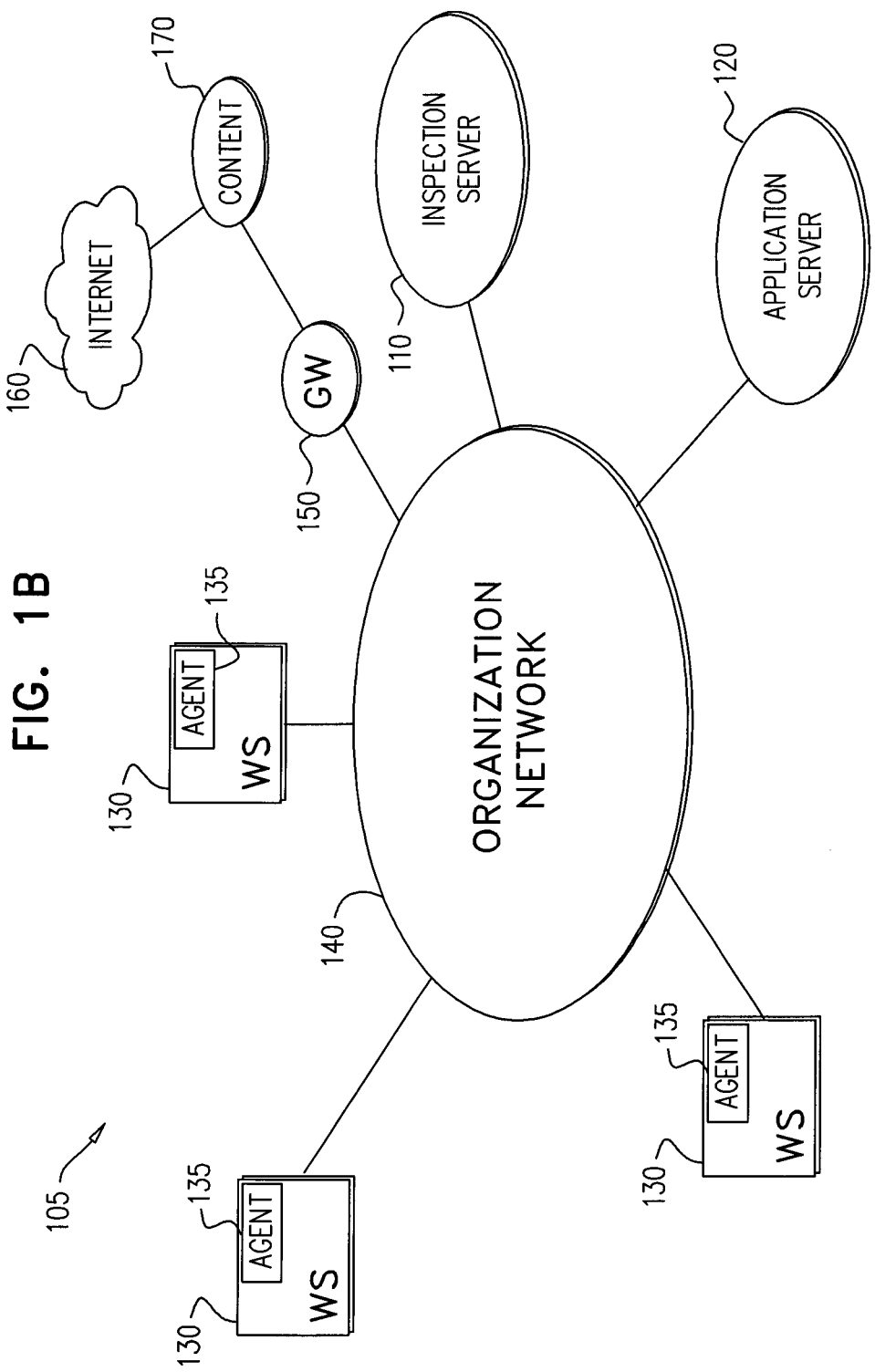
FIG. 1B is a schematic illustration of an alternative system for inspecting files in an organizational network, according to an exemplary embodiment of the disclosure.

FIG. 1A is a schematic illustration of a system 100 for inspecting files in an organizational network 140 and FIG. 1B is a schematic illustration of an alternative system 105 for inspecting files in an organizational network 140, according to an exemplary embodiment of the disclosure. In an exemplary embodiment of the disclosure, organization network 140 connects between multiple workstations 130 and optionally to one or more application servers 120. Optionally, workstations 130 and server 120 may have access to external resources from outside the organizational network 140 (e.g. the Internet 160 via a gateway 150). Optionally the external resources may provide content 170 such as email messages and attachments, active web sites and/or other types of content. In an exemplary embodiment of the disclosure, an inspection server 110 is placed inline between organization network 140 and gateway 150 to intercept and analyze files or other content 170 that is sent to workstations 130 or are accessed by workstations 130, for example if workstation 130 wants to access a web site, inspection server 110 first analyzes the content 170 provided by the web site (e.g. active content) to determine that it is non-malicious data and not a malicious malware. Likewise inspection server 110 will analyze emails and email attachments to prevent malicious malware from entering workstations 130 of the organization.

In some embodiments of the disclosure (e.g. FIG. 1B), the gateway 150 may be connected directly to the organization network 140 and active content will be redirected to the inspection server 110, for example by an agent application 135 in system 105 installed on the workstations 130 of organization network 140. Optionally, inspection of the content is performed inline, for example the agent 135 preventing use of the content until it is checked. Alternatively, inspection of the content is performed offline, for example checking the content and notifying the workstation 130 if determining that the workstation 130 has become infected.

In some embodiments of the disclosure, the workstations 130 may serve as terminals that execute processes on the inspection server 110 (e.g. like a CITRIX server), wherein the inspection server executes live virtual machines to execute processes and inspection virtual machines to inspect content 170, or inspect the content on the live virtual machine. Alternatively or additionally, the inspection server 110 may be executed as an application or as the operating system/hypervisor on workstations 130.

In an exemplary embodiment of the disclosure, inspection server 110 activates a virtual machine and executes the content 170 to determine if it is acts normally or acts in a suspicious or malicious manner. Optionally, during activation of the content 170, inspection server 110 traces the content of the memory of monitored processes, control flow and other parameters as explained below. Inspection server 110 verifies that the content 170 does not perform malicious activity before releasing it to the workstation 130 or authorizing use of the content 170 if it is already available to the workstation 130.

In some embodiments of the disclosure, inspection server 110 may perform standard virus inspections, for example based on signatures to obviate the need to inspect known malware.

Figure 2:
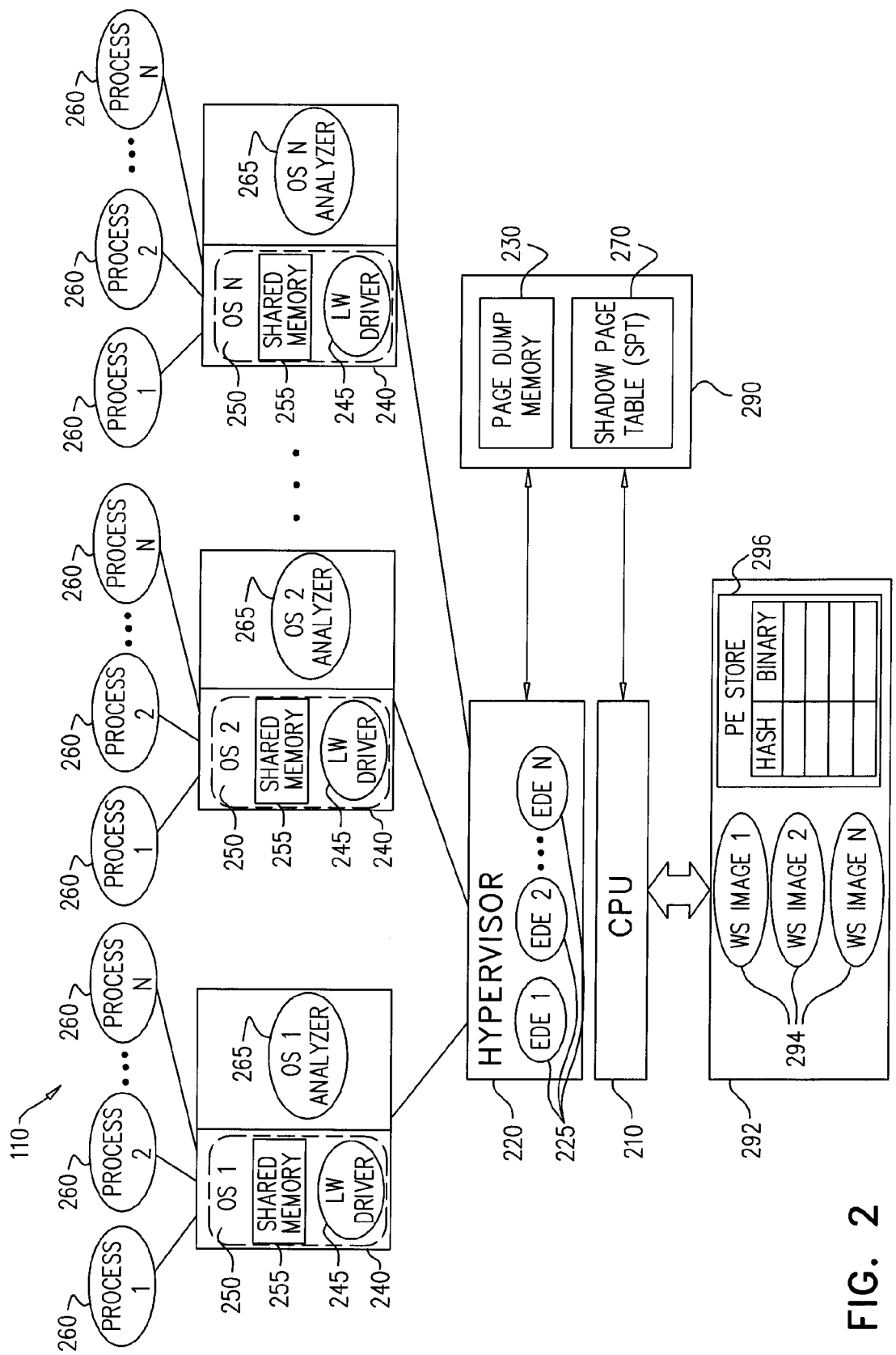
FIG. 2 is a schematic illustration of elements of an inspection server for inspecting content in an organization, according to an exemplary embodiment of the disclosure.

FIG. 2 is a schematic illustration of elements of inspection server 110 for inspecting content 170 in an organization, according to an exemplary embodiment of the disclosure. Optionally, inspection server 110 is implemented using a standard general purpose computer having a processor (CPU) 210 and memory 290. In an exemplary embodiment of the disclosure, the processor of inspection server 110 is selected to support the following features:

1. (A debug feature (e.g. BTS, LBR, BTM, INTEL PT)) Providing details of flow control instructions as they are executed, for example to specific registers, a memory or the system bus; and 2. (A virtualization feature (e.g. INTEL-VT)) Use of a shadow page table 270. Optionally the shadow page table 270 allows setting an enforceable access level for each memory page, for example read only, read write, read execute and read write execute. Optionally, having sufficient privileges the access level can be set for each page by setting status bits in the shadow page table 270.

In an exemplary embodiment of the disclosure, the above options are supported both in a virtualized mode and a non-virtualized mode of the processor 210. An example of processors that supports the above features are the INTEL HASWELL microprocessor series.

In an exemplary embodiment of the disclosure, inspection server 110 executes a hypervisor 220 that serves as a virtual machine monitor to load and execute a virtual machine environment 240 with an operating system (OS) 250 matching the operating system of the workstation 130 targeted to receive the content 170 for inspection (e.g. WINDOWS, LINUX, OSX). Optionally, hypervisor 220 or inspection server 110 initially inspect all the workstations 130 of the organization network 140 to determine, what operating system 250 is implemented on the workstation 130 and what programs that are made up from executable processes 260 are installed, for example OFFICE 2010, ACROBAT READER XI, INTERNET EXPLORER 11 and the like. In an exemplary embodiment of the disclosure, hypervisor 220 prepares a loadable image 294 for each workstation 130 so that when a content 170 is intercepted for a specific workstation 130 hypervisor 220 can activate a virtual machine 240 with the respective loadable image 294 so that the virtual machine 240 emulates the environment of the targeted workstation 130.

In some embodiments of the disclosure, a default image that represents an initial organization workstation can be used. Optionally, the initial organization workstation image may be provided by the organization. In some embodiments of the disclosure, the image may include similar programs as those installed on workstation 130, for example different versions or programs from different companies that handle the same content.

The content 170 is then activated in the virtual machine 240 like it would be activated in the workstation 130, for example if the content is a PDF file that would be activated by executing ACROBAT READER on workstation 130 then it will activated with ACROBAT READER in virtual machine 240. In some embodiments of the disclosure, the virtual machine 240 will inspect the content 170 only with a default program for handling that type of content 170. Alternatively, virtual machine 240 may inspect the content 170 with more than one program if the user has more than one program installed for handling that type of content, for example ACROBAT READER, FOXIT READER and PDF XCHANGE VIEWER.

Optionally, the loadable images 294 are stored in a storage 292 that is accessible by inspection server 110, for example an internal or external hard disk. Optionally, the loadable images 294 may be updated periodically or upon installation of new programs on the respective workstation 130 being emulated by the loadable image 294, for example by a system administrator when installing the new programs.

In an exemplary embodiment of the disclosure, when interception server 110 intercepts a content 170 for a workstation 130 it activates the following elements:

1. A virtual machine 240 with the respective environment including operating system 250 and processes 260, for executing the content 170 as if it were being executed on the respective workstation 130;

2. A respective exploit detection engine (EDE) 225 to handle a respective virtual machine 240 and operating system as explained below (e.g. EDE(1) for OS(1), EDE(2) for OS(2) and EDE(N) for OS(N)).

3. A respective shared branch memory 255 that is shared by the operating system 250, a respective light weight driver 245 (described below), processor 210, the respective exploit detection engine 225 in the hypervisor 220 and the respective OS analyzer 265. Optionally, the shared branch memory 255 is fed by the processor 210 with the sequence of branch instructions performed by the respective virtual machine 240.

4. The respective light-weight driver 245 interfaces between the operating system 250 and the exploit detection engine 225 of the hypervisor, setting any parameters required, for example allocating the shared branch memory when initiating the operating system 250. Optionally, upon activation of a process 260 in operating system 250 light-weight driver 245 provides the respective exploit detection engine 225 with the page directory addresses (CR3) of the memory pages utilized by the processes 260, configuration information for configuring the processor 210 for each process 260 and identification information regarding the activated processes, for example hashes of the content of the loaded modules or paths of the loaded module files (e.g. DLLs in MS WINDOWS operating systems) of the process. Additionally, light weight driver 245 reports and keeps track of the initialization and termination of activated processes. In an exemplary embodiment of the disclosure, light weight driver 245 is also in charge of dumping the data from memory pages that are indicated as needing to be dumped to a page dump memory 230 by notifying the respective exploit detection engine 225 in hypervisor 240 to accept a page dump. Optionally, light weight driver 245 is also responsible for providing information to translate local addresses of the local processes 260 to normalized addresses so that the exploit detection engine 225 and an OS analyzer 265 (described below) can correlate between the processes 260 and the data containing local addresses like branch traces and dumped pages.

5. The operating system (OS) analyzer 265 serves to analyze trace content and may be run in parallel or interchangeably with its respective operating system 250, for example operating system analyzer 265 may analyze information provided by the respective operating system 250 while the operating system is running or operating system 250 may be halted so that the information may be analyzed before continuing to execute.

In an exemplary embodiment of the disclosure, instead of light-weight driver 245 providing the hash ID to identify the loaded modules in each process and initiating a dump of the data pages from newly activated processes 260, the inspection server 110 maintains a dynamic modules and executable store (PE) store 296. The PE store 296 uses the loadable images 294 to form a table with the hash ID information and the initial data of the identified modules of each processes 260 (e.g. from all DLL and EXE in the image). Accordingly, upon initiation of a new process 260 the light-weight driver 245 only needs to provide the hash ID without initiating a dumping process of the page data.

Figure 3:
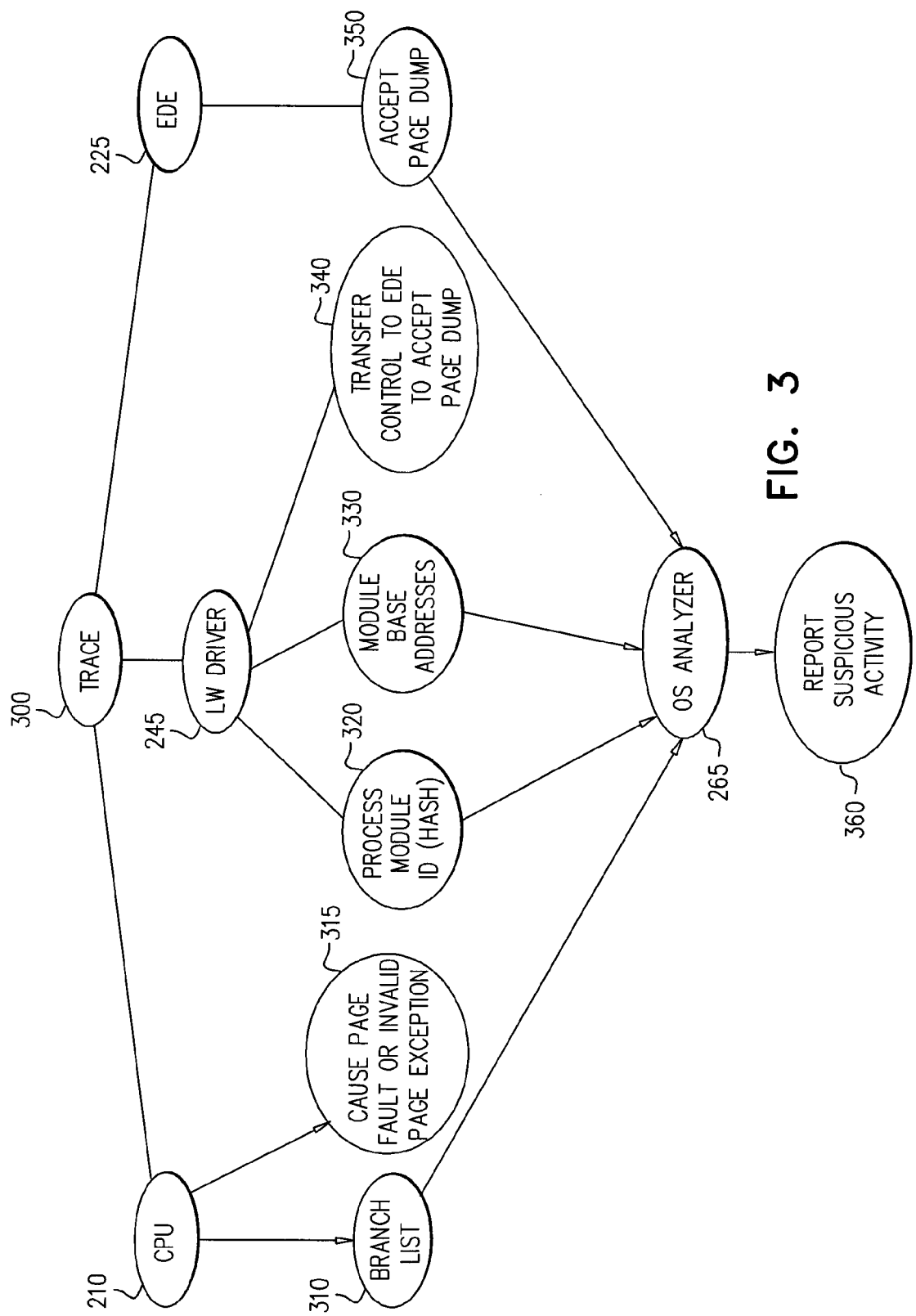
FIG. 3 is a schematic diagram of a tracing process for inspecting an intercepted content in a virtual machine, according to an exemplary embodiment of the disclosure.

FIG. 3 is a schematic diagram of a tracing process 300 for inspecting an intercepted content 170 in a virtual machine 240, according to an exemplary embodiment of the disclosure. In an exemplary embodiment of the disclosure, after loading virtual machine 240 to inspect content 170, hypervisor 220 begins to trace the execution of the virtual machine 240, the intercepted content 170 and processes 260 executed in virtual machine 240. Optionally, the trace is maintained mainly by the following three elements of interception server 110: The lightweight driver 245, the processor 210 and the respective exploitation detection engine 225 of hypervisor 220, although other elements help in maintaining the trace.

In an exemplary embodiment of the disclosure, the trace is performed as follows:

1. (310) The processor (CPU) 210 provides a flow stream listing the commands and destination addresses of all the flow control commands executed by the processor 210 (e.g. branch/jump/ret/call).

2. (315) The processor (CPU) 210 further causes a page fault interrupt and/or an invalid page interrupt when detecting a discrepancy between shadow page table 270 and the requested action (e.g. write to an execute page) or when attempting to access a non existent page or to access a page by a process having insufficient privileges.

3. (320) The lightweight driver 245 provides a list of all process modules being executed by the virtual machine, for example a hash ID of the file containing the module to identify the process;

4. (330) The lightweight driver 245 provides the module base addresses of all pages belonging to the executed processes 260 and/or notification that a module/process was initiated or unloaded;

5. (340) The lightweight driver 245 transfers control to the respective exploitation detection engine (EDE) 225 to accept a page dump of pages, for example upon initiation or termination of a process 260 and/or for some memory events occurring during execution of process 260 as explained below in reference to FIG. 4 related to performing the trace.

6. (350) The respective exploitation detection engine (EDE) 225 receives control, accepts the page dump and activates the respective OS analyzer 265 to check if malicious activity occurred based on the branch list, the list of active processes, the respective page addresses of the processes and the dumped data from active pages.

7. (360) If OS analyzer 265 identifies suspicious activity it reports the findings, for example to an administrator, a log file and/or to the workstation 130 that was supposed to be exposed to the content 170. Optionally, the notification may prevent access to the suspicious content or may allow the user of the workstation 130 to decide if to accept the content or not based on the findings of inspection server 110. In some embodiments of the disclosure, workstation 130 may be disconnected from the organization network if there is concern that the workstation 130 may be infected or damaged.

Figure 4:
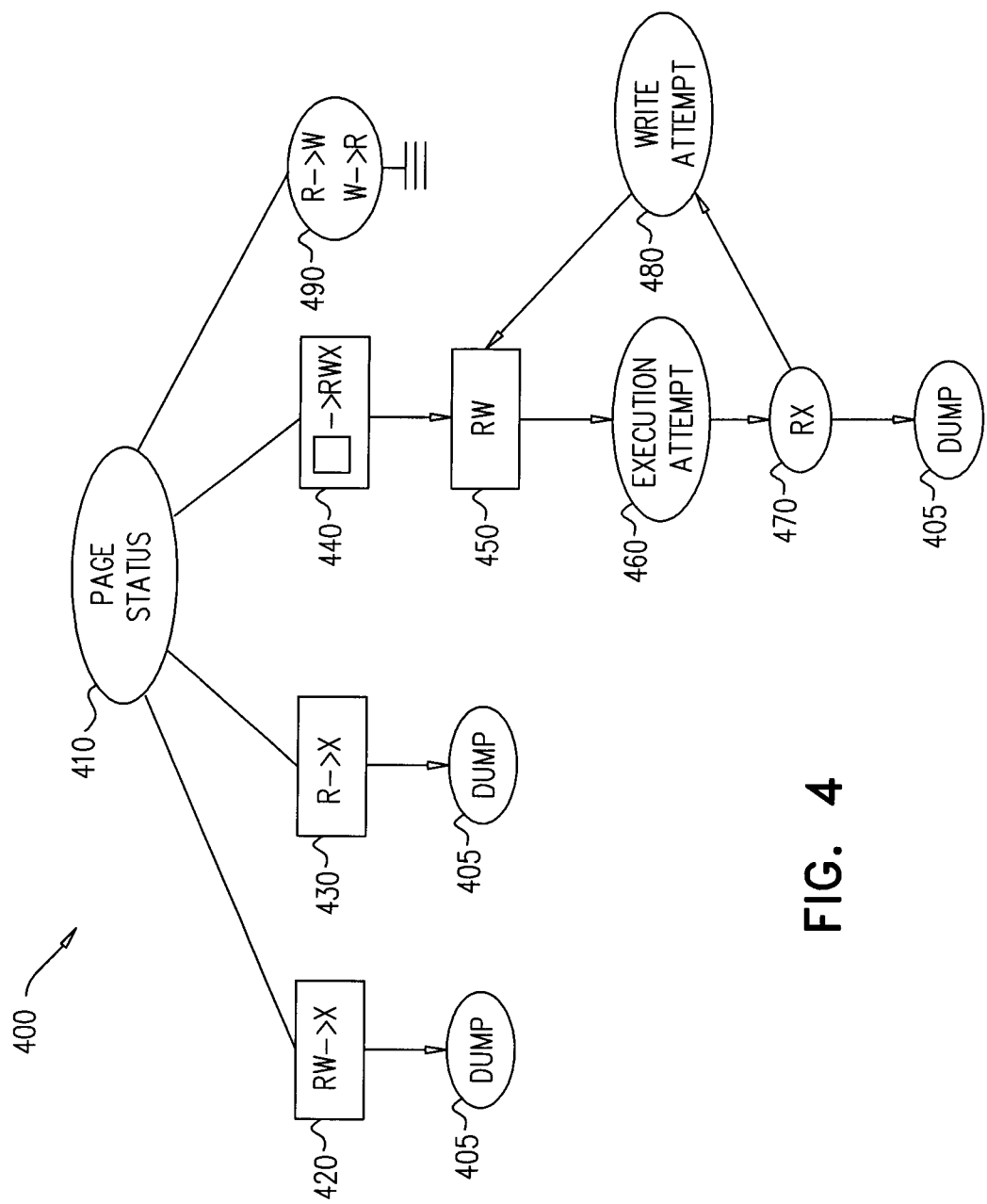
FIG. 4 is a state diagram for tracing memory data during inspection of a content, according to an exemplary embodiment of the disclosure.

FIG. 4 is a state diagram 400 for tracing memory data during inspection of content 170, according to an exemplary embodiment of the disclosure. Optionally, to dynamically trace executed code each page of process 260 is given a status defining actions that are allowed to be performed with that page, for example read only (R), read/write (RW), execute instructions (X), read/write/execute (RWX). The status of each page is marked in shadow page table 270 and supported by the processor 210 as explained above. Optionally, upon change of a page status (410) in a specific virtual machine 240 an interrupt occurs and the respective exploit detection engine 225 is provided control to review the change and verify that no malicious exploitation has occurred. In an exemplary embodiment of the disclosure, the following changes may occur:

1. (420) Upon change from read/write (RW) to execute (X) the data of the page that changed is dumped (405) to page dump memory 230.

2. (430) Upon change from read (R) to execute (X) the data of the page that changed is dumped (405) to page dump memory 230.

3. (440) Upon change from any state to read/write/execute (RWX) the status is changed (450) to read/write (RW) so that a warning will be received when the page is required for execution. If an attempt is made to execute instructions (460) from the page the status is changed (470) to read/execute (RX) to allow the execution and the page is dumped (405). If an attempt is made to write (480) to the page the status is changed 450 to read/write (RW) to allow the writing.

4. (490) Upon change from read to write or write to read or changes other than the above, no action is taken In an exemplary embodiment of the disclosure, the above process enables the hypervisor 220 to track changes in the pages of process 260 that is being executed in response to content 170 before, during and after execution. Accordingly, the changes can be analyzed by OS analyzer 265 to locate code that is exploiting vulnerabilities of the original process. In an exemplary embodiment of the disclosure, a program that is prepared by a compiler would have distinct pages that are read only, pages that are read/write and pages with code for execution. Accordingly, strange changes to the status of the pages, for example writing to a read only page and then executing code from the page might indicate suspicious activity typical of malicious exploitation.

In some embodiments of the disclosure, OS analyzer 265 checks only when notified of suspicious activity. Alternatively or additionally, OS analyzer 265 may use various algorithms and even act proactively to analyze the recorded code collected by the tracing process.

Figure 5:
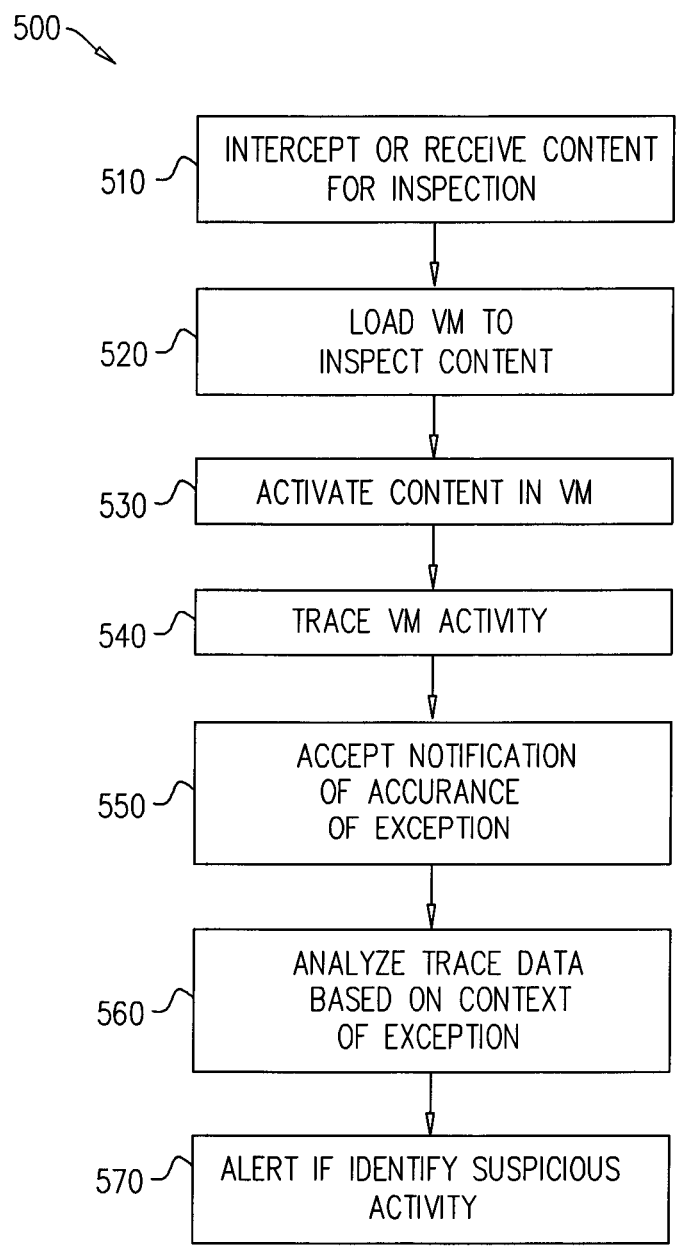
FIG. 5 is a flow diagram of a method of inspecting a content, according to an exemplary embodiment of the disclosure.

FIG. 5 is a flow diagram of a method 500 of inspecting content 170, according to an exemplary embodiment of the disclosure. As explained above content 170 is intercepted or received (510) by interception server 110. Optionally, hypervisor 220 loads (520) a virtual machine 240 by loading a loadable image 294 representing the workstation 130 to which the content 170 was intended to be delivered. In an exemplary embodiment of the disclosure, content 170 is activated (530) in the virtual machine 240 with a respective process 260 for executing the content 170. In an exemplary embodiment of the disclosure, the activity of the virtual machine 240 is traced (540), for example by keeping track of all the pages involved, all the branch instructions performed and dumping all the pages with code that is about to be executed. Optionally, during the tracing process the recorded data is validated (550) to assure that no malicious exploitation of the processes 260 is taking place.

In an exemplary embodiment of the disclosure, inspection server 110 detects known exploitation methods, for example:

1. Return Oriented Programming (ROP) in which the traced flow control is examined to verify that return instructions indeed return from a call instruction (e.g. do not jump to an address inserted into the stack to break away from the original process 260).

2. Crash Detection of the process 260 or operating system 250 responsive to activation of the content 170.

3. Supervisor Mode Escalation Protection (SMEP) (e.g. INTEL vPRO security feature)—preventing execution from user mode memory pages while the current processor privilege level is lower than 3, for example if a malware exploits vulnerability in the operating system programs (with a high privilege level) causing them to transfer control to execute instruction from a page with a low privilege level. Optionally, such an action will cause an interrupt and be handled by the respective exploit detection engine 225 in hypervisor 220.

4. Jump Oriented Programming (JOP)—an exploitation method that eliminates reliance on the stack and ret instructions (including ret-like instructions such as pop+jmp) seen in return-oriented programming. In many cases ROP is the most common exploitation method, wherein the malicious exploit violates the stack to transfer control to a shell-code. In an exemplary embodiment of the disclosure, certain events cause exceptions that cause an interrupt and control is transferred to the respective exploit detection engine 225 in hypervisor 220. Optionally, upon accepting (550) notification of occurrence of an exception the hypervisor 220 will halt execution of the operating system 250 and transfer control to the OS analyzer 265.

Following is a list of exemplary exceptions causing control to be transferred to the hypervisor to verify that the cause was legitimate or identify malicious exploits:

1. Context switch—when the operating system transfers control from one process to another the page directory address (CR3) is changed. Optionally, the hypervisor verifies that the debugging features of the processor 210 are activated and that the new page directory address (CR3) is in the list of monitored processes.

2. Shared memory is full—the shared memory 255 stores the list of branch addresses provided by the processor 210 during execution of the virtual machine 240. Optionally, when the shared memory is full the respective exploitation detection engine 225 of hypervisor 220 notifies the OS analyzer to verify that the addresses do not violate rules (e.g. no ROP patterns) and empties the shared memory to continue accepting more addresses.

3. The built in exploitation detection feature of the processor 210 provides notification if the processor is in a different level than the page with the code being executed, for example a processor set to level 0 (admin level) and the executed page is in level 3 (user mode).

4. Process crash—if the operating system 250 identifies that a process 260 has crashed (e.g. stops responding). Optionally, the hypervisor may attempt to rerun the process 260. However if the process crashes multiple times the content 170 will be considered suspicious.

5. Operating system crash—if the operating system 250 crashes the hypervisor can reload the operating system 250 and rerun. Optionally, if the Operating system crashes multiple times the content 170 will be considered suspicious.

6. Receiving information from the lightweight driver 245 (e.g. process address information, processor 210 configuration information).

7. An attempt to read from protected operating system areas by a code page that was writable and changed to executable.

In an exemplary embodiment of the disclosure, the OS analyzer 265 analyzes (560) the trace data based on the context of the exception (e.g. what caused the exception) to locate the initial source leading to the exception (e.g. how did control get transferred to execute a page that was supposed to contain only non code data). Optionally, responsive to the analysis inspection server 110 will alert (570) the workstation 130 that suspicious or malicious code was sent to it or attempted to attack it.

In an exemplary embodiment of the disclosure, the code for performing the above method on inspection server 110 may be stored on a non-transitory medium such as a CD, DVD, hard disk, backup tape, diskonkey, paper printout or other medium so that it can be loaded and executed on a general purpose computer having a processor and memory.

In some embodiments of the disclosure, processor 210 includes additional debugging features (PMI) such as enabling the processor to be programmed to initiate interrupts for exceptions defined by the inspection server 110. Optionally, the processor 210 will cause an interrupt for specific events, for example the processor can cause an interrupt for executing a specific instruction by more than a predetermined number of times.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of inspecting content intended for a workstation to inspect content that performs exploits, comprising:
    receiving the content for inspection at an inspection server using a processor and memory;
    loading a virtual machine at the inspection server with an operating system and processes for inspecting the content, wherein the operating system and processes emulate those executed at the intended workstation;
    activating the content in the virtual machine; and,
    tracing the activity of the virtual machine to form trace data by using features of the processor, the tracing the activity including receiving a memory page marked as read/write/execute and changing the memory page permissions in a shadow page table to read/write; and,
    if an attempt to execute code from the memory page occurs, then changing the memory page permissions in the shadow page table to read/execute and dumping the content of the memory page;
    then, if an attempt to write to the memory page occurs, changing the memory page permissions in the shadow page table to read/write; and,
    upon an occurrence of an exception, transferring control from the inspection server to an analyzer that analyzes the trace data based on a context of the exception, and, a notification is provided if suspicious activity is detected.

2. A method according to claim 1, wherein the inspection server intercepts the content before being provided to the workstation.

3. A method according to claim 1, wherein the inspection server receives the content from the workstation.

4. A method according to claim 1, wherein the trace includes recording details of flow control instructions executed by the virtual machine.

5. A method according to claim 1, wherein the trace includes recording a list of modules inside processes executed by the virtual machine and the addresses of memory pages used by the modules.

6. A method according to claim 1, wherein the trace includes recording a page dump of memory pages used by modules of processes executed by the virtual machine when initializing the modules.

7. A method according to claim 1, wherein the trace includes recording a page dump of a memory page used by modules of processes executed by the virtual machine before starting to execute code from the memory page.

8. A method according to claim 1, wherein the exception includes a change in the executed page address due to transfer of control from one process to another by the operating system.

9. A method according to claim 1, wherein the exception includes receiving notification that a memory for storing details of flow control instructions executed by the virtual machine is full.

10. A method according to claim 1, wherein the exception includes receiving notification if the processor is set to execute code from a user mode memory page while the current privilege level of the processor is lower than 3.

11. A method according to claim 1, wherein the trace includes recording a page dump of a memory page wherein the page permission changed from-non executable to executable.

12. A method according to claim 1, wherein the exception includes receiving notification that the process crashed or that the operating system crashed.

13. A method according to claim 1, wherein activity is suspicious if activation of the content leads to detection of jump oriented programming (JOP) patterns.

14. A method according to claim 1, wherein activity is suspicious if activation of the content leads to detection of return oriented programming (ROP) patterns.

15. A method according to claim 1, wherein activity is suspicious if activation of the content leads to a crash of the process or of the operating system in the virtual machine.

16. A method according to claim 1, wherein activity is suspicious if activation of the content leads to the processor being set to a different execution level than a memory page with the code being executed.

17. A non-transitory computer readable medium comprising computer code to be executed by a general purpose computer for performing a method according to claim 1.

* * * * *